United States Patent
Epstein

(10) Patent No.: US 7,113,966 B2
(45) Date of Patent: Sep. 26, 2006

(54) METHOD AND APPARATUS FOR DECORRELATING A RANDOM NUMBER GENERATOR USING A PSEUDO-RANDOM SEQUENCE

(75) Inventor: Michael A. Epstein, Spring Valley, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 575 days.

(21) Appl. No.: 09/912,685

(22) Filed: Jul. 25, 2001

(65) Prior Publication Data

US 2003/0023647 A1    Jan. 30, 2003

(51) Int. Cl.
   *G06F 1/02* (2006.01)
(52) U.S. Cl. ..................... 708/250; 708/252
(58) Field of Classification Search ........ 708/250–252; 380/46
   See application file for complete search history.

(56) References Cited

U.S. PATENT DOCUMENTS

| | | | |
|---|---|---|---|
| 3,810,039 A | 5/1974 | Fein | |
| 4,355,366 A | 10/1982 | Porter | |
| 4,641,102 A | 2/1987 | Coulthart et al. | |
| 4,691,291 A | 9/1987 | Wolfram | |
| 4,799,259 A | 1/1989 | Ogrodski | |
| 5,239,494 A | 8/1993 | Golbeck | |
| 5,668,481 A | 9/1997 | Sheu et al. | |
| 6,065,029 A * | 5/2000 | Weiss | 708/251 |
| 6,631,390 B1* | 10/2003 | Epstein | 708/250 |
| 6,714,955 B1* | 3/2004 | Le Quere | 708/250 |
| 2003/0101205 A1* | 5/2003 | Weimerskirch | 708/250 |

FOREIGN PATENT DOCUMENTS

| | | |
|---|---|---|
| FR | 2802661 A1 | 6/2001 |
| WO | WO0167231 | 9/2001 |

\* cited by examiner

*Primary Examiner*—Tan V. Mai
(74) *Attorney, Agent, or Firm*—Michael J. Ure

(57) ABSTRACT

A method and apparatus are disclosed for generating random numbers using the meta-stable behavior of flip-flops. A flip-flop is clocked with an input that deliberately violates the setup or hold times (or both) of the flip-flop to ensure meta-stable behavior. When a meta-stable event is detected, an output bit is provided as a random bit. An even random number distribution is obtained by "marking" half of the zeroes input to the flip-flop as "ones" and the other half of the zeroes as "zeroes." In addition, half of the ones are marked as "ones" and the other half of the ones are marked as "zeroes." The marking signal is uncorrelated to any noise to a high probability using a linear feedback shift register.

33 Claims, 6 Drawing Sheets

METHOD AND APPARATUS FOR DECORRELATING A RANDOM NUMBER GENERATOR USING A PSEUDO-RANDOM SEQUENCE

CROSS-REFERENCE TO RELATED APPLICATIONS

The present invention is related to U.S. patent application Ser. No. 09/519,549, filed Mar. 6, 2000, entitled "Method and Apparatus for Generating Random Numbers Using Flip-Flop Meta-Stability," assigned to the assignee of the present invention and incorporated by reference herein.

FIELD OF THE INVENTION

The present invention relates to random number generation, and more particularly, to a method and apparatus for generating random numbers using flip-flop meta-stability.

BACKGROUND OF THE INVENTION

Flip-flops and latches are widely used in computers and other electronic devices, for example, as sampling, counting and storage elements. A number of flip-flop types have been developed, such as D-type flip-flops ("data"), R-S latches ("reset and set"), J-K flip-flops (having J and K inputs) and T flip-flops (having only one input). A D-type flip-flop, for example, is a clocked flip-flop whose output is delayed by one clock pulse.

A conventional R-S latch 100 is shown in FIG. 1A. As in FIG. 1A, the R-S latch 100 is comprised of two NOR gates 110 and 120. The outputs of the two NOR gates 110, 120 are cross-connected to a respective input of the opposite NOR gate. Thus, NOR gate 110 receives the output of NOR gate 120 and a reset 30 signal, R, as inputs. Likewise, NOR gate 120 receives the output of NOR gate 110 and the set signal, S, as inputs.

More recently, the simple latches shown in FIG. 1A have been replaced by edge-triggered flip-flops, such as the D-type flip-flop 150 is shown in FIG. 1B. Such D-type flip-flops are often used to detect the logic state of an asynchronous digital signal having an unpredictable timing relative to the clock signal. A rising signal is applied to the clock input, CLK, of the flip-flop 150, while a digital logic level of the asynchronous signal to be detected is directed to the D input. The detected signal is then produced on the Q output line. As long as the clock does not rise again, the output Q does not change. Thereafter, the flip-flop 150 simply changes state to the value on the D input whenever the CLK signal rises (so long as the reset signal is tied permanently to ground).

The latches 100 shown in FIG. 1A are susceptible to meta-stability. For a detailed discussion of meta-stability, see, for example, Application Note, A Meta-Stability Primer, AN219, Philips Semiconductors (Nov. 15, 1989), incorporated by reference herein. Generally, meta-stability can occur when both inputs to a latch 100 are set at a high logic value ("11"), and are then reset to a low logic value ("00"). Under these conditions, the latch outputs can oscillate unpredictably in a statistically known manner. In theory, the latch 100 can oscillate indefinitely. In practice, however, the latch 100 will randomly shift and arrive at a random output value of either logic low or high. Typically, these meta-stable values are subsequently detected by other circuitry in a given application and can be interpreted as different logic level states or assume an intermediate state that can be misinterpreted by other logic gates.

In addition, the edge-triggered flip-flop 150 shown in FIG. 1B can become meta-stable when the setup or hold times of the flip-flop are violated. Edge-triggered flip-flops 150 are susceptible to meta-stability because inside every edge-triggered flip-flop 150 there is a latch 100 being fed by the edge detection circuitry. If the setup or hold times are violated then the internal latch 100 will observe inputs that can trigger the meta-stable state.

Many applications and electronic devices require random numbers, including games of chance, such as poker, roulette, and slot machines. In particular, numerous cryptographic algorithms and protocols depend on a non-predictable source of random numbers to implement secure electronic communications and the like. A random number generator should generate every possible permutation in the designated range of numbers. In addition, the random number generator should not be biased and should generate any given number with the same probability as any other number. Moreover, the random number generator should generate random numbers that cannot be predicted, irrespective of the size of the collection of previous results. Thus, the random numbers should be completely unpredictable and non-susceptible to outside influences.

U.S. patent application Ser. No. 09/519,549, filed Mar. 6, 2000, entitled "Method and Apparatus for Generating Random Numbers Using Flip-Flop Meta-Stability," discloses a method and apparatus for generating random numbers using the meta-stable behavior of flip-flops. A flip-flop is clocked with an input that deliberately violates the setup or hold times (or both) of the flip-flop to ensure meta-stable behavior. A bit is collected whenever there is an error. If meta-stability occurs more frequently with one binary value (either zero or one) for a given class of flip-flops, an even random number distribution is obtained by "marking" half of the zeroes as "ones" and the other half of the zeroes as "zeroes." In addition, half of the ones are marked as "ones" and the other half are marked as "zeroes".

Marking input bits in this manner theoretically provides an even distribution of random output bits. While meta-stability occurs on a random basis, it has been found that the duration and occurrence of meta-stability is affected by noise. Thus, if the noise is correlated to the marking signal, then the output of the random number generator will not be random. A need therefore exists for a method and apparatus for generating random numbers using meta-stability that is not influenced by noise or other outside forces. A further need exists for a method and apparatus for generating random numbers using meta-stability that that uses a marking signal that is uncorrelated with a high probability to any noise in the system.

SUMMARY OF THE INVENTION

Generally, a method and apparatus are disclosed for generating random numbers using the meta-stable behavior of flip-flops. A flip-flop is clocked with an input that deliberately violates the setup or hold times (or both) of the flip-flop to ensure meta-stable behavior. The meta-stable operation of the flip-flop provides a mechanism for generating random numbers.

Each time the flip-flop becomes meta-stable, the outcome of the oscillation is random as to the outcome or logic value attained after the oscillation ceases. If the outcome differs from the value that would have been attained during correct operation (a "mistake") then the meta-stable event can be detected. If a repeating sequence of zeroes and ones is used as an input to the flip-flop there will be an opportunity to make "mistakes" with either a zero or a one.

An even distribution of ones or zeroes are obtained by "marking" (i) half of the zeroes as "ones" and the other half of the zeroes as "zeroes;" (ii) half of the ones as "ones" and the other half as "zeroes;" or (iii) both. Thus, irrespective of the ratio of mistakes made in the zero state or the one state, the distribution of random output bits will remain even.

The present invention decorrelates the marking signal to any system noise to a high probability. Thus, an unbiased signal source (with regards to frequency of zeroes and ones) is used as the marking signal. A linear feedback shift register (LFSR) is employed to decorrelate the marking signal. The linear feedback shift register should have sufficient length to decrease the chance of correlation and reduce any bias in the LFSR output. Longer shift registers have longer sequences and thus have a very high probability of not being coordinated with a noise source.

A more complete understanding of the present invention, as well as further features and advantages of the present invention, will be obtained by reference to the following detailed description and drawings.

DETAILED DESCRIPTION

Figure 1A:
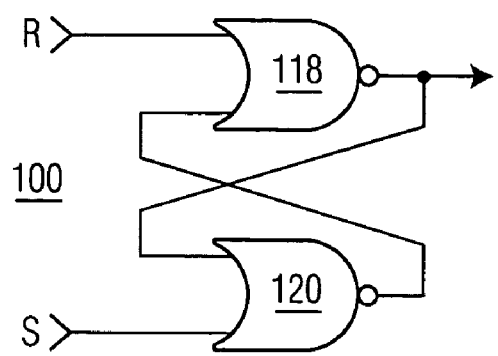
FIG. 1A illustrates a conventional R-S latch.
Figure 1B:
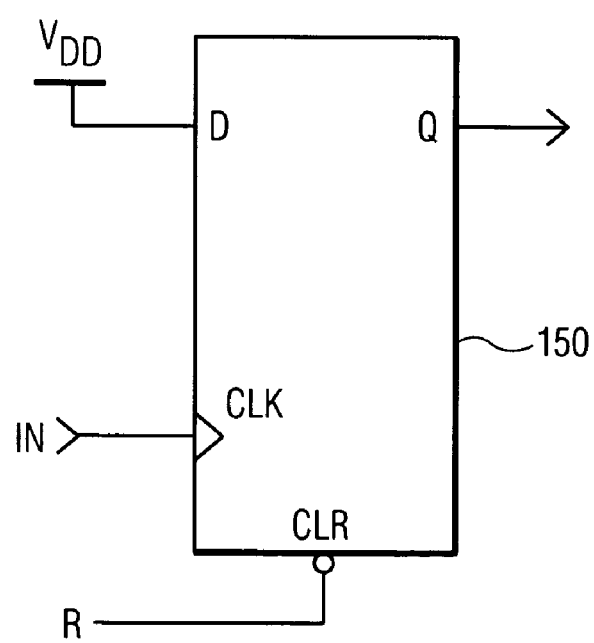
FIG. 1B illustrates a conventional D-type flip-flop.
Figure 2A:
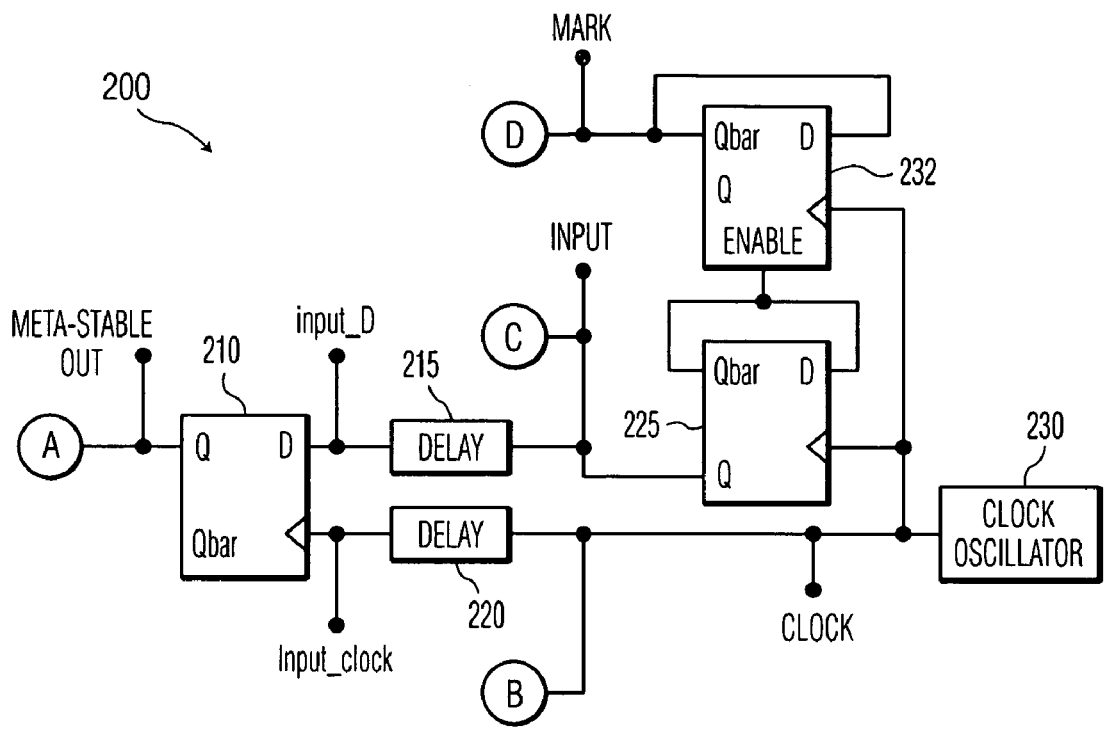
FIG. 2A illustrates a random number generator in accordance with the teachings of U.S. patent application Ser. No. 09/519,549, filed Mar. 6, 2000, entitled "Method and Apparatus for Generating Random Numbers Using Flip-Flop Meta-Stability.

FIG. 2A illustrates a random number generator 200 in accordance with the teachings of U.S. patent application Ser. No. 09/519,549, filed Mar. 6, 2000, entitled "Method and Apparatus for Generating Random Numbers Using Flip-Flop Meta-Stability." The random number generator 200 provides an even distribution of random output bits by "marking" half of the zeroes as "ones" and the other half of the zeroes as "zeroes." In addition, half of the ones are marked as "ones" and the other half are marked as "zeroes".

As shown in FIG. 2A, the random number generator 200 includes a flip-flop 210, delays 215, 220, D-type flip-flops 225, 232 and a clock oscillator 230. The flip-flop 210 is clocked with an input that deliberately violates the setup or hold times (or both) of the flip-flop 210 to ensure meta-stable behavior. The setup or hold times can be violated, for example, using delays 215, 220. The flip-flop 210 can be embodied, for example, as a D, T or JK type flip-flop. In addition, the flip-flop 210 could be embodied as a simple latch 100 and a slightly different circuit, as would be apparent to a person of ordinary skill in the art.

A clock source is generated by a clock oscillator 230 and a D-type flip-flop 225 whose Qbar output is fed back into its D input. In this manner, the D-type flip-flop 225 operates in the same manner as a T-type flip-flop (toggled output), to provide a divide-by-two mechanism. Thus, the D input of the flip-flop 210 is driven by alternating ones and zeroes. The divide-by-two flip-flop 232 generates a Mark signal, shown in FIG. 2C, that marks half of the zeroes in the waveform, Input, as "ones" and the other half of the zeroes as "zeroes."

Figure 2B:
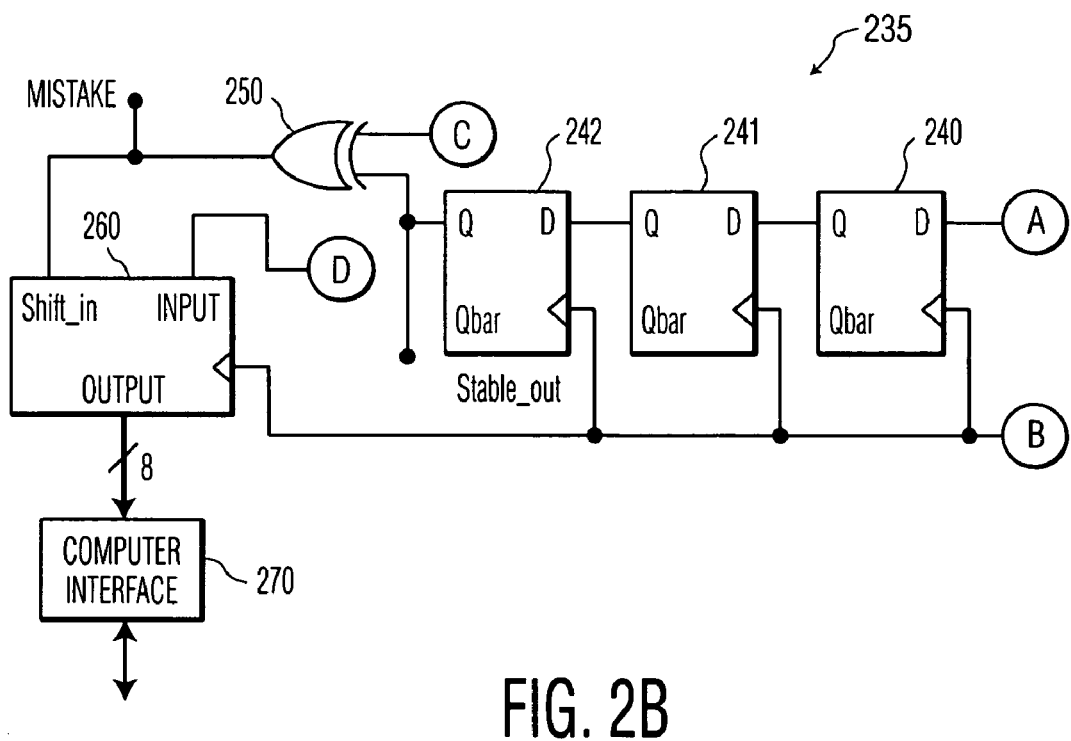
"
FIG. 2B illustrates a synchronizing circuit that may be utilized to synchronize the output of the random number generator of FIG. 2A with a clock source.
Figure 2C:
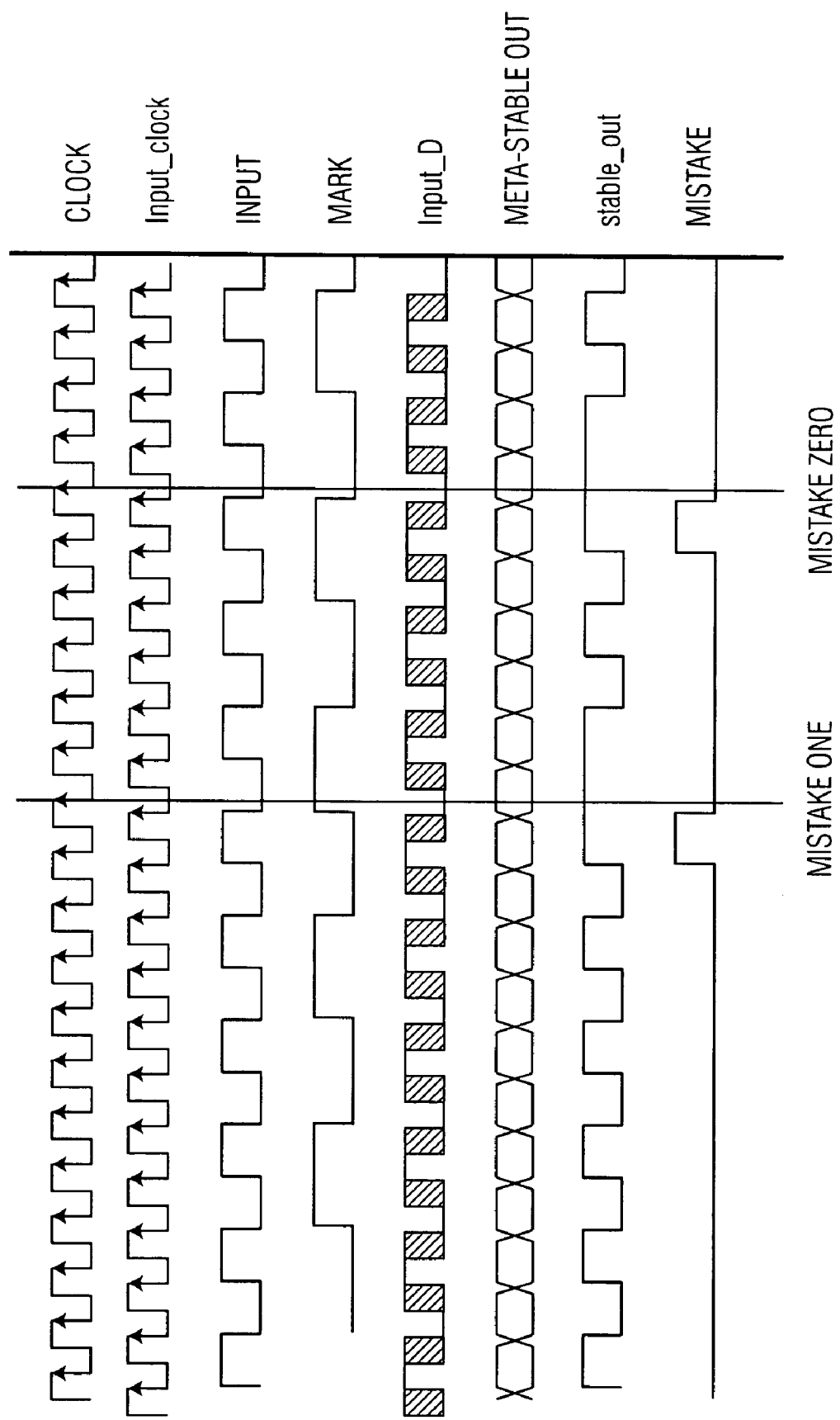
FIG. 2C illustrates a set of waveforms produced by the circuits of FIGS. 2A and 2B.

As seen most clearly in FIGS. 2A and 2C, the waveform Clock produced by the clock oscillator 230 is obtained at the sample point marked "Clock" in FIG. 2A. The waveform Input produced by the divide-by-two flip-flop 225 is obtained at the sample point marked "Input" in FIG. 2A. The waveform Input_D produced by delay 215 and the waveform Input_clock produced by delay 220 are obtained at the corresponding sample points in FIG. 2A. The waveform Mark produced by the divide-by-two flip-flop 232 is obtained at the sample point marked "Mark" in FIG. 2A.

As shown in FIG. 2C, the violation of the setup or hold times (or both) by the delays 215, 220 ensures that the flip-flop 210 will exhibit meta-stable behavior, as demonstrated by the waveform Meta_stable_out. As discussed further below, the meta-stable operation of the flip-flop 210 provides a mechanism for generating random numbers.

As a result of the delay from the delays 215, 220, the inherent delay in the flip-flop 210 itself, and most importantly from the non-uniform delay from the meta-stable behavior, the waveform Meta_stable_out is not synchronized to the waveform Clock. Thus, to make the random number generator 200 of FIG. 2A suitable for synchronous applications, an illustrative mechanism is provided in FIG. 2B to synchronize the waveform Meta_stable_out with the waveform Clock. It is noted that the circuitry of FIGS. 2A and 2B are connected by joining the bubbles of like letters.

The synchronizing circuitry 235 shown in FIG. 2B includes a number of serial flip-flops 240–242 that are selected so as to not enter a meta-stable state easily. In addition, if one of these flip-flops 240–242 does become meta-stable, the period of the clock signal should be long enough so that the output of the meta-stable flip-flop will settle to a fixed logic value (either 0 or 1), such that when the signal is sampled at the next flip-flop 240–242, the flip-flop is stable. In this manner, each flip-flop 240–242 improves the chance of synchronizing the waveform Meta_stable_out with the waveform Clock, while removing any meta-stability. Indeed, the chances of incorrect behavior for such a circuit will be measured in tens of years.

The exclusive or gate ("XOR") 250 compares the synchronized version of waveform Meta_stable_out with the waveform Input (sampled at the output of the divide-by-two flip-flop 225). Since the output of the XOR gate 250 will be high if and only if two inputs differ, the output of the XOR gate 250 ("Mistake") will be high if the waveform stable_out does not match the input signal. The output of the XOR gate 250 ("Mistake") is applied to the shift input (Shift_in) of a shift register 260, and the shift register 260 will shift a bit over from the Mark signal every time there is a Mistake. Thus, the first embodiment of the present invention collects a bit whenever there is an error (mistake).

The input line of the shift register 260 is connected to the Mark signal. In this manner, each time there is a Mistake, the shift register 260 will shift in a bit from the Mark signal. Thus, as shown in FIG. 2C, for mistake zero, a bit equal to one (based on the Mark signal) will be acquired. Similarly, for mistake one, a bit equal to zero (based on the Mark signal) will be acquired.

The random number generator 200 also marks the ones input to flip-flop 210 with a mark of either "one" or "zero". Thus, if a mistake occurs with the one value for the input, an even distribution of random bits will also be acquired due to mistakes made with that one value. Therefore, this circuit is insensitive to the bias between errors that occur in the one or zero input value.

As previously indicated, marking input bits in the manner discussed above in conjunction with FIGS. 2A through 2C provides an even distribution of random output bits. It has been found, however, that the duration and occurrence of meta-stability can be affected by noise. Thus, if the noise is correlated to the marking signal, then the output of the random number generator will not be random.

According to one feature of the present invention, an unbiased (with regards to frequency of zeroes and ones) signal source is used as the marking signal. The marking signal is uncorrelated with a high probability to any noise in the system. The present invention employs a linear feedback shift register (LFSR) with sufficient length to decrease the chance of correlation and reduce any bias in the LFSR output. Suitable LFSRs are described, for example, in Bruce Schneier, Applied Cryptography, pages 369–388 (Wiley, 1994).

Figure 3:
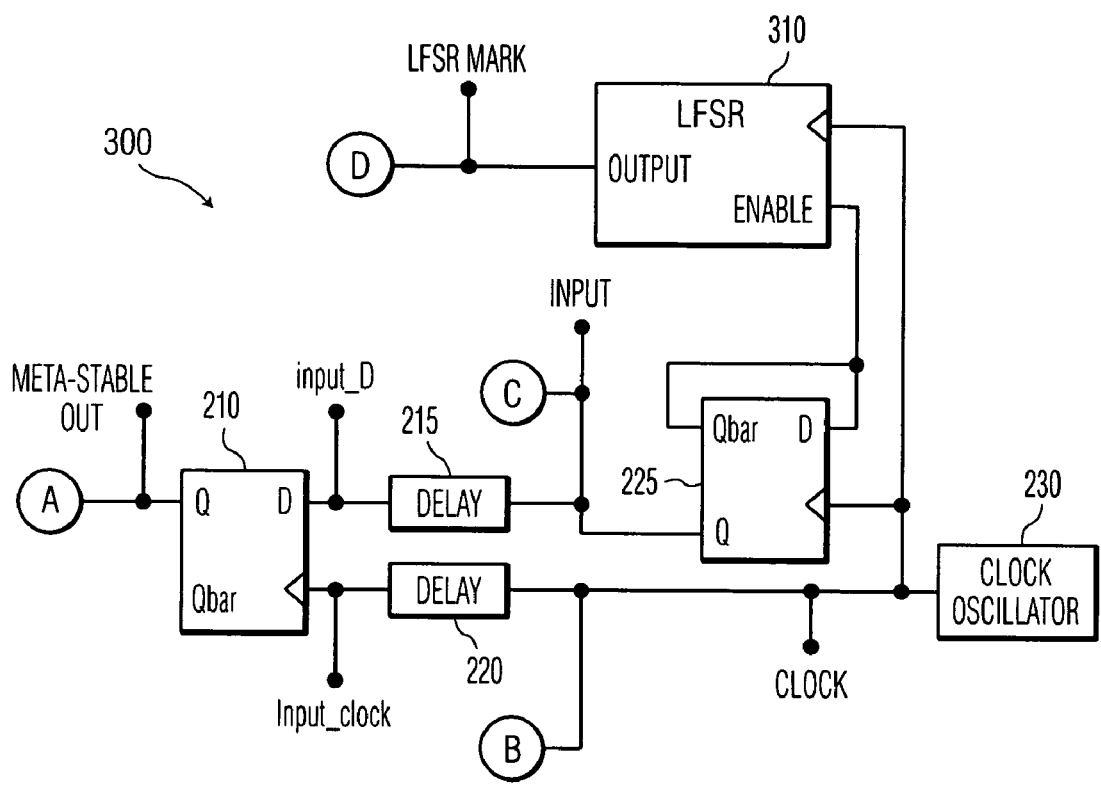
FIG. 3 illustrates an improved random number generator in accordance with the present invention.
Figure 4:
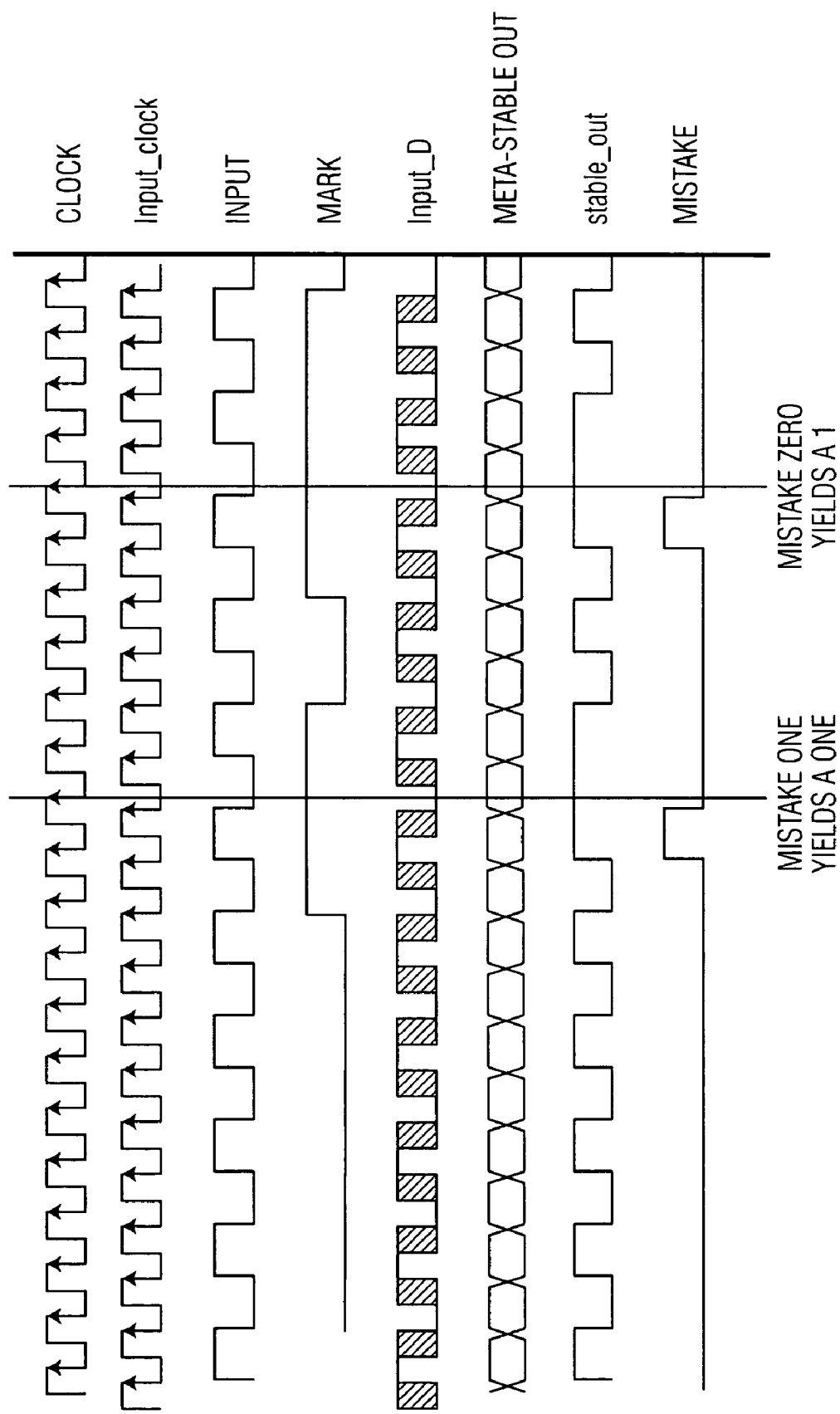
FIG. 4 illustrates a set of waveforms produced by the circuits of FIGS. 3 and 2B.

FIG. 3 illustrates a random number generator 300 in accordance with the present invention. As shown in FIG. 3, the random number generator 300 includes a flip-flop 210, delays 215, 220, a D-type flip-flop 225 and a clock oscillator 230 that operate in the same manner as described above in conjunction with FIG. 2A. In addition, the random number generator 300 includes a linear feedback shift register 310 that generates an LFSR Mark signal, shown in FIG. 4, that marks slightly more than half of the zeroes in the waveform, Input, as "ones" and almost half of the zeroes as "zeroes," that is uncorrelated to a high probability to any noise in accordance with the present invention. The signal always has a slight bias since for an n bit LFSR there are only $2^{n-1}$ patterns (the all zeros pattern never occurs). This bias becomes insignificant if n is large.

Thus, the random number generator 300 of FIG. 3 replaces the marking flip flop 232 of FIG. 2A with the linear feedback shift register 310. The linear feedback shift register 310 may be embodied as described in Bruce Schneier, Applied Cryptography, pages 369–388 (Wiley, 1994). The random number generator 300 of FIG. 3 can be utilized with the synchronizing circuit 235 of FIG. 2B to synchronize the output of the random number generator 300 with a clock source.

As previously indicated, the linear feedback shift register 310 should provide a sufficient number of bits to decrease the chance of correlation and reduce any bias in the LFSR output. For a linear feedback shift register 310 comprised of n flip-flops, there will be $2^n-1$ binary numbers before the numbers begin to repeat. Thus, as the number of flip-flops in the linear feedback shift register 310 increases, the −1 in the $2^{n-1}$ binary expression becomes less significant. In any event, since the direction of any bias attributable to the −1 term is known, the bias can be removed or corrected with a suitable circuit, as discussed below in conjunction with FIG. 5.

Thus, the linear feedback shift register 310 provides a marking output, LFSR mark, that is pseudo-random, with half of the output bits being a zero and the other half of the output bits being a one.

It has been observed that if the linear feedback shift register 310 is insecure, a portion of the output (even a random portion) may allow the state of the linear feedback shift register 310 to be known. In this manner, it would be possible to predict the output of the random number generator 300. Thus, a linear feedback shift register 310 should be utilized that has no discernable statistics, thereby making the state information of the linear feedback shift register 310 useless. In a further variation, additional security is achieved by releasing the collected bits out of the shift register 260 and by allowing some of the collected bits to be lost in each collection interval.

The shift register 260 shifts a bit over from the Mark signal every time there is a Mistake. In this manner, the arrival times of the mistakes are not discerned, and someone cannot predict which bits of the linear feedback shift register 310 will be chosen.

Figure 5:
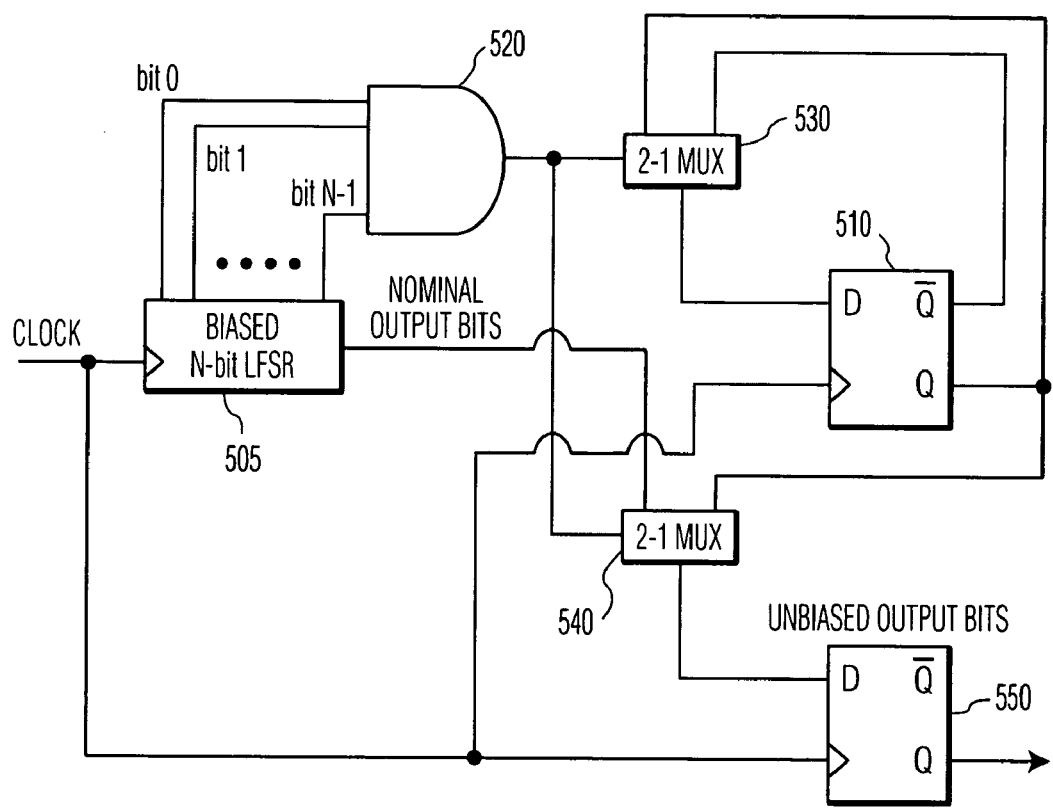
FIG. 5 illustrates an alternate embodiment of the present invention using an unbiased linear feedback shift register.

FIG. 5 illustrates an alternate embodiment of the present invention. As previously indicated, for any maximal length LFSR there will be a slight bias in the ratio between ones and zeroes. This condition arises from the requirement that the all zeroes state never occurs or else the LFSR would cease to change. In other words, if the state of the LFSR was all zeroes, then no XOR combination would yield a one regardless of the number of taps or the number of shifts. Therefore, all states with the exception of the all ones state have a dual state. For instance, given a three-bit LFSR, the state 101 will occur along with the dual state of 010. This is not true, however, for the all ones state (111). If the least significant bit (or any other bit for that matter) is used as the output, then the LFSR will have seven unique states with an output of four ones (1111) and three zeroes (000).

To correct this bias, we can add an lfsrstate flip-flop 510 that only changes and is only used when the all ones state occurs. The initial state of this flip-flop 510 is irrelevant. We first detect the all ones state with an N-bit AND gate 520. The output of this gate 520 will only be true when the all ones state occurs. We connect this AND gate 520 to a pair of 2-to-1 multiplexors 530, 540. The first 2-to-1 multiplexor 530 is used to change the condition of the lfsrstate flip-flop 510 only when the all ones state occurs in the LFSR 505 causing the output of the AND gate 520 to be true. Otherwise, the same state is recirculated to the state flip-flop 510 and its condition does not change. The second 2-to-1 multiplexor 540 ordinarily accepts the nominal output bit from the LFSR 505. When the all ones state occurs in the LFSR 505, then this second 2-to-1 multiplexor 540 accepts a bit from the lfsrstate flip-flop 510. The lfsrstate changes each time the all ones condition occurs. Thus, half of the time the output bit for the corrected LFSR will be one when the state of the LFSR 505 is all ones and half the time the output bit for the corrected LFSR will be zero when the state of the LFSR 505 is all ones. Thus, for every two cycles through all the states of the LFSR 505, the cumulative output received by flip-flop 550 will be completely unbiased, i.e., the number of ones and zeroes in the corrected output bit stream will be even.

For LFSRs where the entire sequence is not used, this circuit is unnecessary as other issues concerning local bias will become more important.

It is to be understood that the embodiments and variations shown and described herein are merely illustrative of the principles of this invention and that various modifications may be implemented by those skilled in the art without departing from the scope and spirit of the invention.

What is claimed is:

1. A method for generating a random number, comprising the steps of: deriving from an input signal to a flip-flop a marking signal including decorrelating said marking signal to noise, wherein said input signal has a first binary value and a second binary value and wherein a value of said marking signal is said first binary value for approximately half of occurrences of said first binary value in said input signal and is said second binary value for approximately half of occurrences of said first binary value in said input signal; operating said flip-flop in a meta-stable state; and generating a random bit from the marking signal based on the occurrence of the meta-stable state.

2. The method of claim 1, wherein said decorrelating is performed by at least one linear feedback shift register.

3. The method of claim 2, wherein said linear feedback shift register provides a sufficient number of bits to decrease the chance of correlation.

4. The method of claim 2, wherein said linear feedback shift register (LFSR) provides a sufficient number of bits to reduce any bias in the LFSR output.

5. The method of claim 2, wherein said linear feedback shift register has a compensation circuit that removes bias from the generated random bits.

6. The method of claim 1, wherein said decorrelating is performed by a collection of linear feedback shift registers.

7. The method of claim 1, wherein said flip-flop is placed in said meta-stable state by violating a set-up time of said flip-flop.

8. The method of claim 1, wherein said flip-flop is placed in said meta-stable state by violating a hold time of said flip-flop.

9. The method of claim 1, wherein said generating step further comprises the step of generating a mistake signal if an output of said flip-flop does not match an applied input.

10. The method of claim 9, wherein to mistake signal causes a random bit to be acquired based on the marking input.

11. The method of claim 1, further comprising the step of synchronizing an output of said flip-flop with a local clock source.

12. The method of claim 1, further comprising the step of collecting a plurality of said random bits to produce a random number.

13. The method of claim 1, wherein said first binary value is zero and said second binary value is one.

14. The method of claim 1, wherein said first binary value is one and said second binary value is zero.

15. The method of claim 1, further comprising the step of releasing collected bits from a shift register to generate said random bit.

16. A method for generating a random number, comprising the steps of: deriving from an input signal to a flip-flop a marking signal, including decorrelating said marking signal to noise, wherein said input signal has a first binary value and a second binary value and wherein a value of said marking signal is said first binary value for approximately half of occurrences of said first binary value in said input signal and is said second binary value for approximately half of occurrences of said first binary value in said input signal; operating said flip-flop in a meta-stable state; and generating a random bit from the marking signal based on the occurrence of said meta-stable state.

17. The method of claim 16, wherein said decorrelating is performed by a linear feedback shift register.

18. The method of claim 17, wherein said linear feedback shift register provides a sufficient number of bits to decrease the chance of correlation.

19. The method of claim 17, wherein said linear feedback shift register (LFSR) provides a sufficient number of bits to reduce any bias in the LFSR output.

20. The method of claim 17, wherein said linear feedback shift register has a compensation circuit that removes bias from the generated random number.

21. The meted of claim 16, wherein said decorrelating is performed by a collection of linear feedback shift registers.

22. The method of claim 16, wherein said generating step further comprises the step of generating a mistake signal if an output of said flip-flop does not match an applied input.

23. The method of claim 16, further comprising the step of collecting a plurality of said random bits to produce a random number.

24. A random number generator, comprising: a flip-flop operated in a meta-stable state; a marking circuit for deriving from an input signal to a flip-flop a marking signal, including at least one linear feedback shift register that decorrelates said marking signal to noise, wherein said input signal has a first binary value and a second binary value and wherein a value of said marking signal is said first binary value for approximately half of occurrences of said first binary value in said input signal and is said second binary value for approximately half of occurrences of said first binary value in said input signal; and means for generating a random bit from the marking signal based on the occurrence of the meta-stable state.

25. The random number generator of claim 24, wherein said first binary value is zero and said second binary value is one.

26. The random number generator of claim 24, wherein said first binary value is one and said second binary value is zero.

27. The random number generator of claim 24, wherein said one or more linear feedback shift registers provide a sufficient number of bits to decrease the chance of correlation.

28. The random number generator of claim 24, wherein said one or more linear feedback shift registers (LFSRs) provide a sufficient number of bits to reduce any bias in the LFSR output.

29. The random number generator of claim 24, wherein said one or more linear feedback shift registers has a compensation circuit that removes bias from the generated random number.

30. A random number generator, comprising: a flip-flop operated in a meta-stable state; a marking circuit for deriving from an input signal to a flip-flop a marking signal, including one or more linear feedback shift registers that decorrelate said marking signal to noise, wherein said input signal has a first binary value and a second binary value and wherein a value of said marking signal is said first binary value for approximately half of occurrences said first binary value in said input signal and is said second binary value for approximately half of occurrences of said first binary value in said input signal; and means for generating a random bit from the marking signal based on the occurrence of the meta-stable state.

31. The random number generator of claim 30, wherein said one or more linear feedback shift registers provide a sufficient number of bits to decrease the chance of correlation.

32. The random number generator of claim 30, wherein said one or more linear feedback shift registers (LFSRs) provide a sufficient number of bits to reduce any bias in the LFSR output.

33. The random number generator of claim 30, wherein said one or more linear feedback shift registers has a compensation circuit that removes bias from the generated random number.

* * * * *